United States Patent
Yee et al.

(10) Patent No.: US 7,620,754 B2
(45) Date of Patent: Nov. 17, 2009

(54) CARRIER CARD CONVERTER FOR 10 GIGABIT ETHERNET SLOTS

(75) Inventors: Alan Yee, Los Gatos, CA (US); Eric Wiles, Sunnyvale, CA (US); James P. Rivers, Saratoga, CA (US); Sandeep Arvind Patel, Los Gatos, CA (US); William F. Edwards, Jr., Livermore, CA (US); Jeffrey Provost, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 463 days.

(21) Appl. No.: 11/090,776

(22) Filed: Mar. 25, 2005

(65) Prior Publication Data

US 2006/0216958 A1    Sep. 28, 2006

(51) Int. Cl.
```
G06F 3/00      (2006.01)
G06F 13/38     (2006.01)
H05K 7/10      (2006.01)
G06F 13/14     (2006.01)
G06F 13/36     (2006.01)
H05K 7/00      (2006.01)
G02B 6/36      (2006.01)
```
(52) U.S. Cl. .......... 710/62; 710/2; 710/8; 710/64; 710/71; 710/301; 710/305; 710/315; 361/728; 385/88; 439/76.1; 439/638; 439/945; 439/955

(58) Field of Classification Search .......... None
See application file for complete search history.

(56) References Cited

U.S. PATENT DOCUMENTS

| | | | | |
|---|---|---|---|---|
| 4,941,841 A | * | 7/1990 | Darden et al. | 361/685 |
| 5,274,767 A | * | 12/1993 | Maskovyak | 710/16 |
| 5,995,376 A | * | 11/1999 | Schultz et al. | 361/788 |
| 6,665,190 B2 | * | 12/2003 | Clayton et al. | 361/736 |
| 6,880,078 B2 | * | 4/2005 | Rabinovich | 713/100 |
| 6,920,517 B2 | * | 7/2005 | Mills et al. | 710/301 |
| 7,003,588 B1 | * | 2/2006 | Takeda et al. | 710/8 |
| 7,008,122 B2 | * | 3/2006 | Mader et al. | 385/92 |
| 7,032,139 B1 | * | 4/2006 | Iryami et al. | 714/704 |
| 7,044,656 B1 | * | 5/2006 | Hofmeister et al. | 385/89 |
| 7,134,796 B2 | * | 11/2006 | Anderson | 385/88 |
| 7,178,996 B2 | * | 2/2007 | Malagrino et al. | 385/89 |
| 7,179,096 B2 | * | 2/2007 | Dube et al. | 439/76.1 |
| 7,194,565 B2 | * | 3/2007 | Mills et al. | 710/301 |
| 7,223,027 B2 | * | 5/2007 | Mader et al. | 385/92 |
| 2004/0030977 A1 | * | 2/2004 | Jiang et al. | 714/742 |
| 2004/0039860 A1 | * | 2/2004 | Mills et al. | 710/301 |

(Continued)

OTHER PUBLICATIONS

XFP Specification. Revision 4.0 (Apr. 13, 2004).*

(Continued)

*Primary Examiner*—Tariq Hafiz
*Assistant Examiner*—Henry Yu
(74) *Attorney, Agent, or Firm*—Charles E. Krueger (57) ABSTRACT

A carrier module is physically compatible with a XENPAK/X2 10 GE slot and includes a socket for accepting a non-XENPAK/X2 module and interface circuitry for providing appropriate signals to a XENPAK/X2 70-pin connector on an interior side of the carrier module. The carrier module includes a cookie, accessible by host software, identifying the type of carrier module and non-XENPAK/X2 module accepted by the carrier card.

13 Claims, 6 Drawing Sheets

U.S. PATENT DOCUMENTS

2004/0197104 A1* 10/2004 Doo et al. .................. 398/164
2004/0252560 A1* 12/2004 Hsieh ......................... 365/199
2005/0066045 A1* 3/2005 Johnson et al. ............. 709/230
2006/0209886 A1* 9/2006 Silberman et al. ........... 370/466

OTHER PUBLICATIONS

Ixia, 10 Gigabit Ethernet Multi-MSA Load Module, Interfaces p. 167-171, downloaded from the Internet: <http://www.ixiacom.com/datasheets/pdfs/in_10g_multi_msa.pdf>.

* cited by examiner

CARRIER CARD CONVERTER FOR 10 GIGABIT ETHERNET SLOTS

BACKGROUND OF THE INVENTION

Routers and switches (in the following referred to generically as routers) used in networking systems include slots for accepting modules and cards that allow a user to customize a router, computer or server for specific environments to satisfy different requirements.

Users have a large investment in previously acquired routers and switches. When a new module is introduced that is incompatible with slots in a previously acquired router the user's capital investment in the legacy equipment may prevent the use of the new module or require additional investment in new routers compatible with the new modules.

Further, there is currently a multitude of different 10 GE (10 Gbps Ethernet) formats splintering the market into a number of small, low volume solutions. Convergence is desired for economies of scale but is hindered by the availability of suitable technologies at a given point in time.

When new higher speed modular uplinks are introduced to the industry customers already have a large capital investment in the existing modules in the field. As such, customers need a method of reusing the existing modules until the next faster modules reach a mature price point that warrants network wide implementation.

The challenges in the field of router slot and module design continue to increase as well as the demand more and better techniques having greater flexibility and adaptability. Therefore, a need has arisen for a new methods and systems to preserve capital investment in existing modules and slots while allowing the use of new technology.

BRIEF SUMMARY OF THE INVENTION

In a first embodiment of the invention, a carrier module includes a XENPAK/X2 70-pin connector at an interior edge, a cage for accepting a non-XENPAK/X2 module at an exterior edge, and interface circuitry for interfacing signals from the non-XENPAK/X2 socket to the XENPAK/X2 70-pin connector.

In another embodiment of the invention, an XFP carrier module includes a XENPAK/X2 70-pin connector at an interior edge including pins forming a XAUI interface, an XFP socket at an exterior edge, and an interface block having an interface for receiving signals output from the XFP cage and a XAUI interface coupled to the XENPAK/X2 70-pin connector.

In another embodiment, the XFP carrier may appear as a new module type or be totally transparent during detection and act like existing X2 or Xenpak modules to avoid the need for new software support.

In another embodiment of the invention, an SFP carrier module includes a XENPAK/X2 70-pin connector at an interior edge, and at least one SFP socket at an exterior edge, with the outputs of the SFP cage coupled to designated "reserved" or "vendor specific" pins of the XENPAK/X2 70-pin connector.

In another embodiment of the invention, SFP carrier module connections to designated 'reserved' pins are not necessary.

In another embodiment, the carrier module includes a cookie holding carrier module ID data accessible to host software.

Other features and advantages of the invention will be apparent in view of the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

As described above, currently there are a multitude of different 10 Gig formats splintering the market into a number of small, low volume solutions. Convergence is desired for economies of scale but is hindered by the availability of suitable technologies at a given point in time. Systems designed for Xenpak and X2 format modules will eventually migrate to the XFP format. A conversion method is needed that can preserve a user's investment while allowing the user to migrate to a converged standard.

The XENPAK Multisource Agreement (MSA) defines a fiber-optic transceiver module which conforms to the 10 Gigabit Ethernet (10 GbE) standard as laid down by the IEEE 802.3ae.

X2 is physically smaller than XENPAK but maintains the mature electrical I/O specification defined by the XENPAK. Electrically, X2 is compatible with the XENPAK MSA and uses the same 70-pin electrical connector as XENPAK supporting four lane XAUI (10-gigabit attachment unit interface). X2 also will support the OIF SFI4_P2 interfaces and serial electrical interfaces as they emerge.

In the following carrier cards are described that are compatible with the XENPAK/X2 70-pin connector. Because the electrical requirements of the XENPAK and X2 modules are the same, it is to be understood that the embodiments described below are functionally equivalent for both types of modules, but that the physical and mechanical aspects will be designed for the appropriate type of XENPAK or X2 slot.

Figure 1:
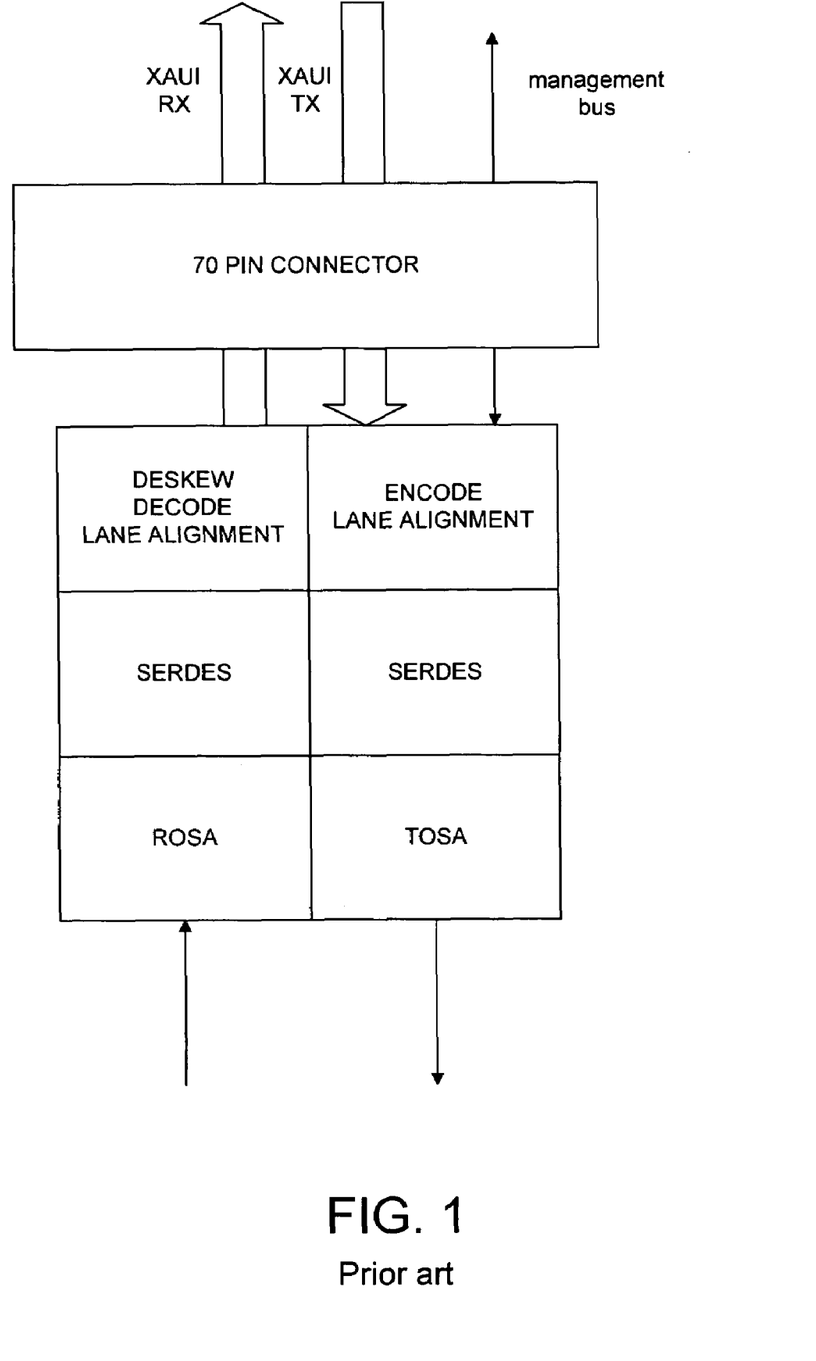
FIG. 1 is a functional block diagram of one type of XENPAK/X2 module.

FIG. 1 is a block diagram (not to scale) depicting the functional layout of a XENPAK or X2 10 GE optical module. A receive side includes a ROSA (Receive Optical Subassembly), a SerDes (Serializer/Deserializer) that converts the received serial signal to a parallel signal, and other functionality. The transmit side includes a TOSA (Transmit Optical Subassembly), SerDes, and other functionality. The modules utilize the XAUI (10 Gigabit Attachment Unit Interface) which is a parallel interface between the physical layer (PHY) and the Media Access Control layer (MAC).

The XENPAK or X2 can also be configured as an electrical module using copper connectors.

The 70-pin connector utilized for X2 and XENPAK includes pins for the Tx and Rx XAUI lanes and also includes management pins coupled to a management bus for configuring and identifying a module inserted into a slot.

The XFP (10 GE Small Form-factor Pluggable) module is a hot pluggable small footprint serial-to-serial data-agnostic multi-rate optical transceiver, that supports Telecom (SONET OC-192 and G.709 "OTU-2") and Datacom applications (10 Gbps Ethernet and 10 Gbps Fiber Channel). Nominal data rates range from 9.95 Gbps, 10.31 Gbps, 10.52 Gbps, 10.70 Gbps, and the emerging 11.09 Gbps.

The XFI is the high speed serial electrical interface for XFP modules with a nominal baudrate of 9.95-11.1 Gbps. XFI connects a serial 9.95-11.1 Gbps SerDes to a module over 300 mm of improved FR41 material or up to 200 mm of standard FR4 with one connector. The electrical interface is based on high speed low voltage AC coupled logic with a nominal differential impedance of 100 Ω. The XFP module could be an Electrical-to-Optical or an Electrical-to-Electrical device.

Thus, XFP and XENPAK/X2 slots are incompatible because XENPAK/X2 modules include a SerDes and exchange parallel data with the host over the XAUI interface while the XFP exchanges serial data with the host and the conversion between serial and parallel data is performed by an ASIC on the host.

The positioning of the SerDes on the host side reduces the complexity and therefore the cost, size, and power consumption of the XFP module while increasing port density.

In this embodiment, the technique for conversion allows for the use of XFP in existing systems having either XENPAK or X2 slots. It allows an existing base of XENPAK/X2 module users to migrate to the new module format without a forklift change of the base system. Since early adopters of 10 Gigabit ports made a large capital investment, giving these early adopters the ability to continue to use their existing systems during the transition to XFP is a distinct advantage. In addition, it provides a cost advantage for users since XFP modules are expected to be less expensive than XENPAKs or X2 modules.

Figure 2:
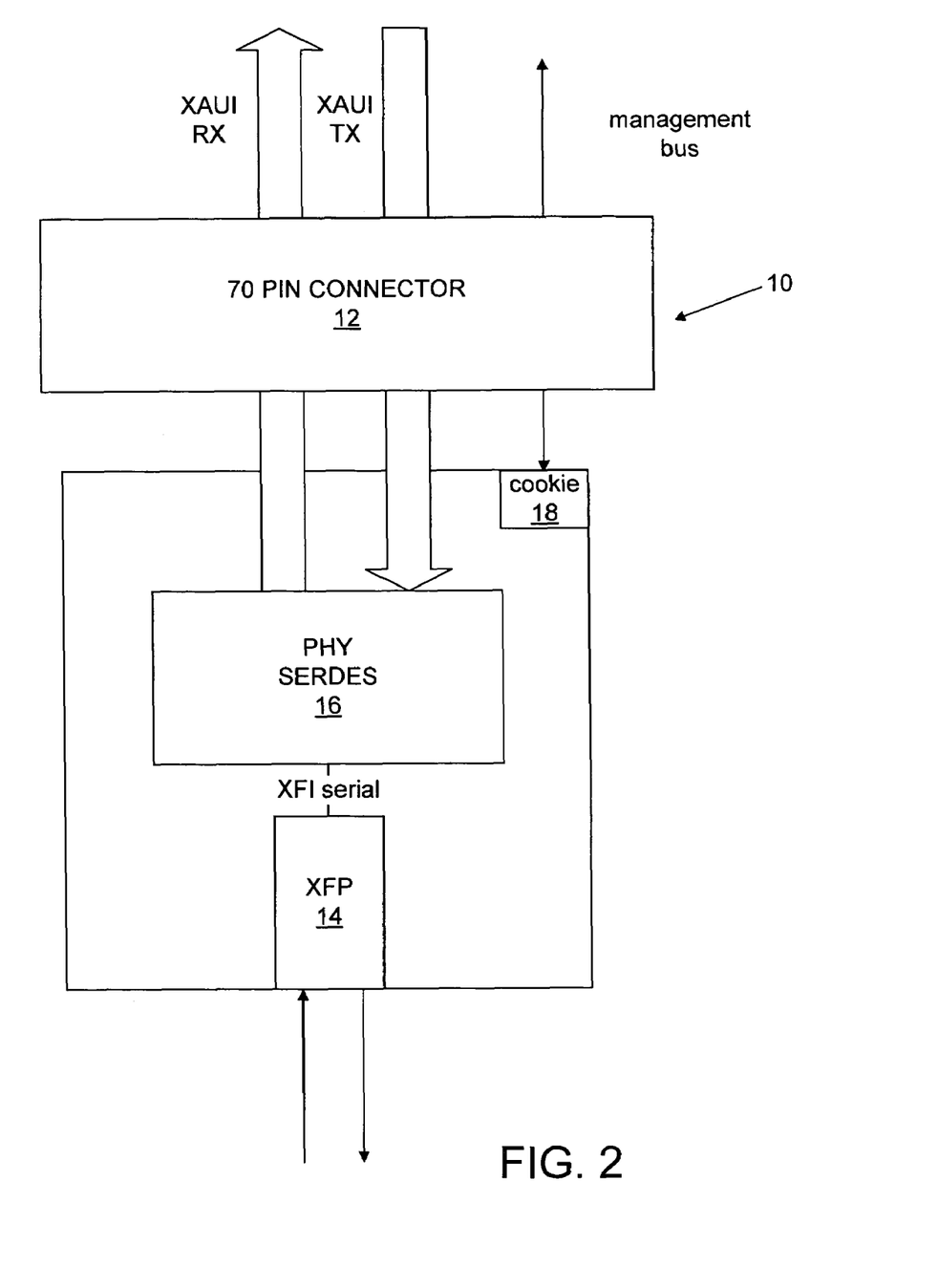
FIG. 2 a functional block diagram of one type of XFP carrier module.

FIG. 2 depicts an embodiment of the invention in the form of a carrier module 10 (not to scale) that is physically compatible with either an XENPAK or X2 slot. The carrier has a XENPAK/X2 70-pin connector 12 on one end and a XFP cage 14 on the other.

The carrier module also has a PHY device 16 on board including a XAUI to 10 Gigabit serial transceiver that forms an interface between the XFI serial interface of the XFI module and the XAUI interface between the XENPAK/X2 modules and the host.

A cookie 18 on the module, in the form of a non-volatile memory, holds module identification information and may be read by host software utilizing the management bus.

Figure 3:
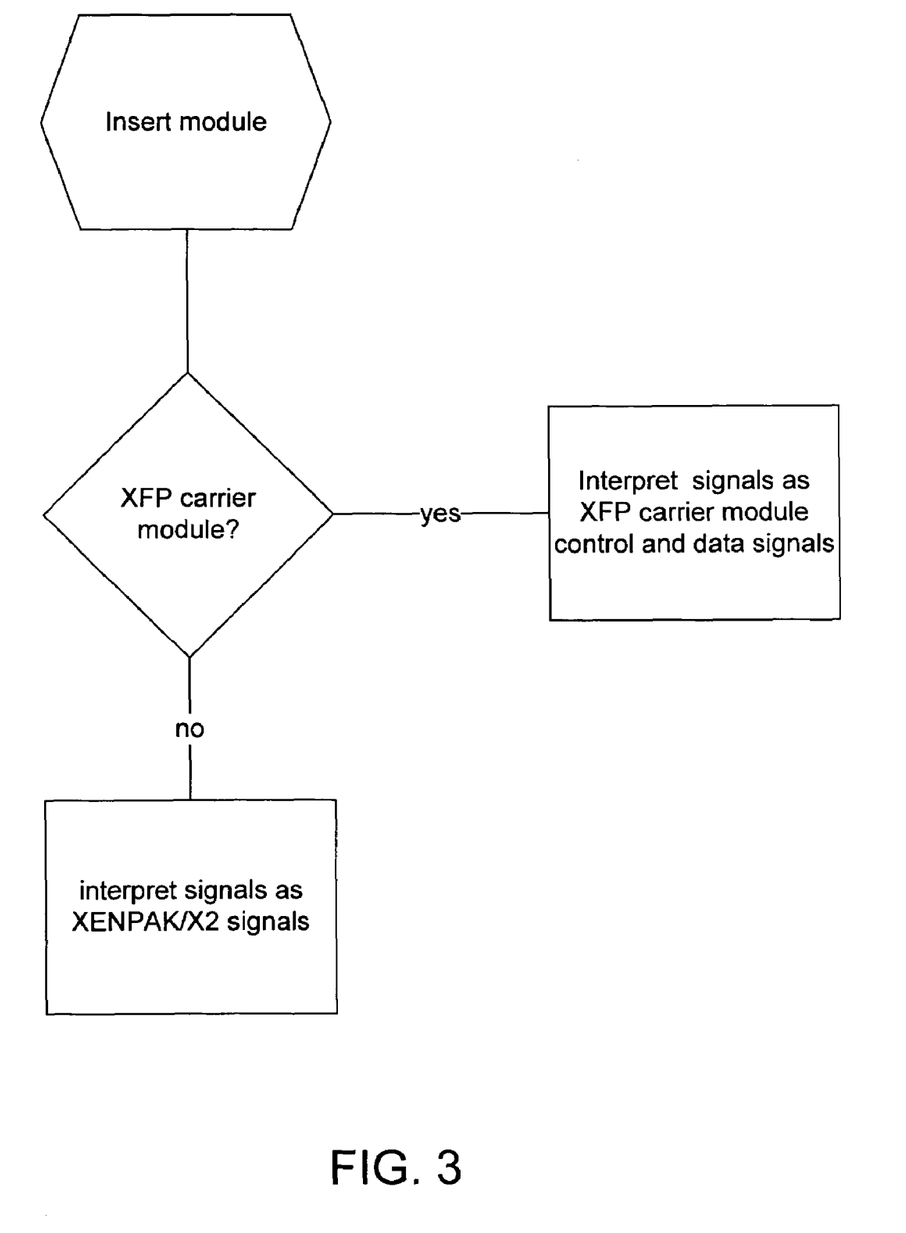
FIG. 3 is a flow chart illustrating the operation of one embodiment of the XFP carrier module.

FIG. 3 is a flow chart illustrating the operation of this embodiment. Each module has identification information stored in the cookie. When a module is plugged into a XENPAK/X2 slot, host software reads the cookie and determines whether a XENPAK/X2 module or an XFP carrier module has been inserted If a XENPAK/X2 module is inserted the non-XAUI signals exchanged over the XENPAK/X2 70-pin interface are standard XENPAK/X2 signals.

Alternatively, the XFP carrier module can be configured to be completely transparent to the XENPAK/X2 interface so existing software can be utilized with no modification.

In this transparent mode, when an XFP carrier module is inserted in the slot the non-XAUI signals are exchanged over the standard XENPAK/X2 70-pin interface.

As described above, customers purchasing a new router, computer or server may already have a substantial investment in legacy equipment such as SFP (Small Form-factor Pluggable) modules that are used as a 1 GE (I Gbps Ethernet) interface between the router, computer or server and other networking devices. The purchase of a router, computer or server having a XENPAK or a X2 slot would make that part of the router, computer or server dedicated to receiving XENPAK or X2 modules unable to communicate with devices using SFPs.

Figure 4:
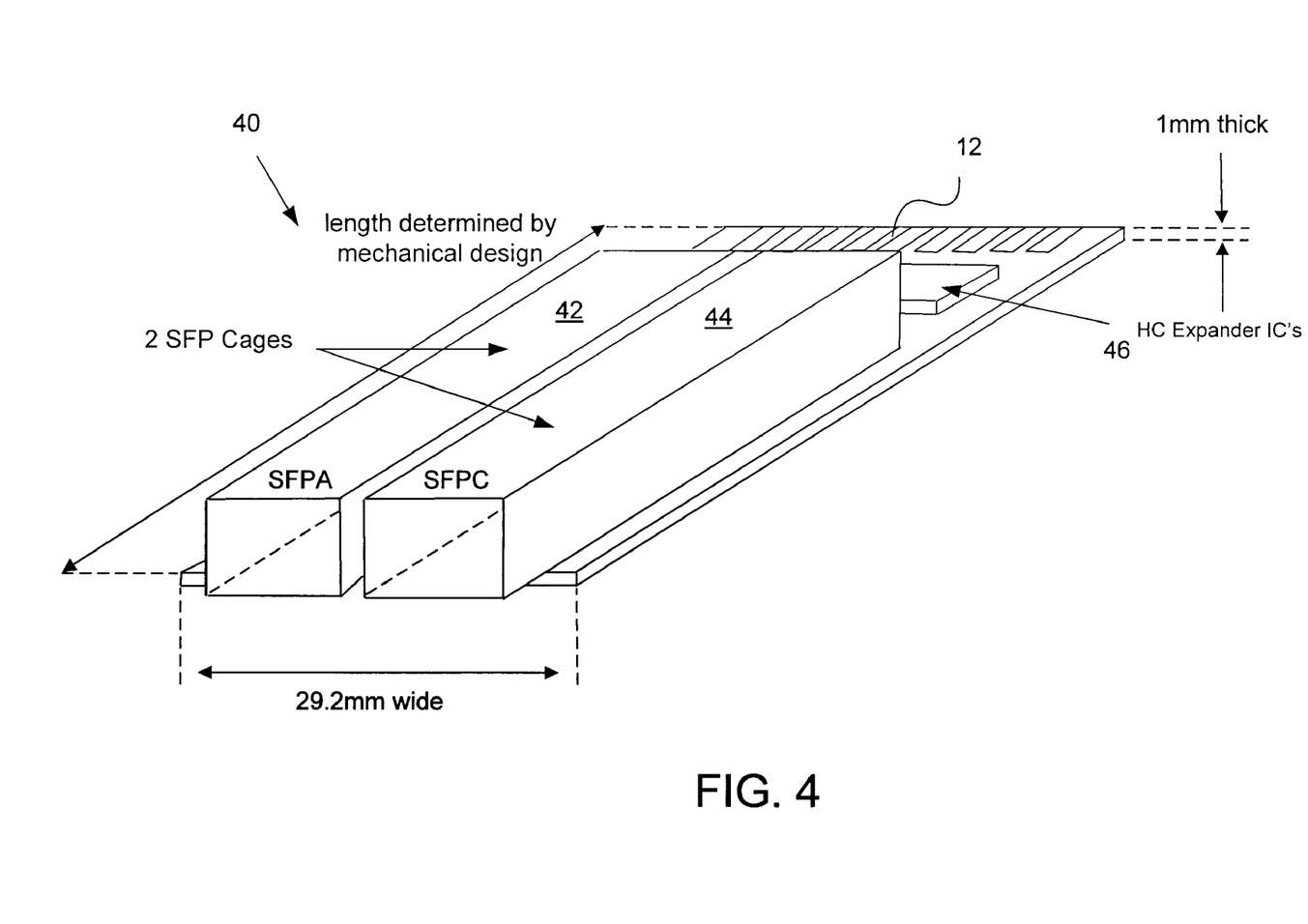
FIG. 4 is a perspective, cut-away view of an SFP carrier module.

FIG. 4 depicts a schematic diagram of an SFP carrier module 40 that allows two SFP modules to be plugged into the XENPAK/X2 slot. The carrier module has a XENPAK/X2 70-pin connector 12 at one end and two SFP cages 42 and 44 on the other end and has the same dimensions as a XENPAK/X2 module.

Accordingly, the SFP carrier module can be inserted into the enhanced XENPAK/X2 slots. Referring to FIG. 4, the internal layout of an embodiment of the SFP adaptor carrier module is depicted where the external part of the SFP adaptor carrier module is identical to a XENPAK or X2 module and has a form factor and connector specified by the XENPAK/X2 MSA. The carrier card has two SFP cages and SFP connectors mounted on a primary surface with the openings of the cages oriented towards an external edge of the adaptor card. The module also has IIC expander ICs 46 for multiplexing control signals and interfacing with cookies on the SFP modules.

In this embodiment, the adaptor module utilizes "reserved" and/or "vendor specific" pins of the 70-pin XENPAK/X2 connector for the SFP high-speed signaling functions and shares the serial management interface, 3.3V, and ground detection signals with the XENPAK/X2 modules.

The SFP MSA defines a two-wire serial management interface for accessing a serial ID EEPROM (cookie) in the SFP. In this embodiment, this serial interface is multiplexed by the IIC expander ICs 46 into 3 channels for the SFP cookie and control signals. Two of the channels are used to read/write the SFP cookies and the other channels are used to read and write SFP control signals.

Figure 5:
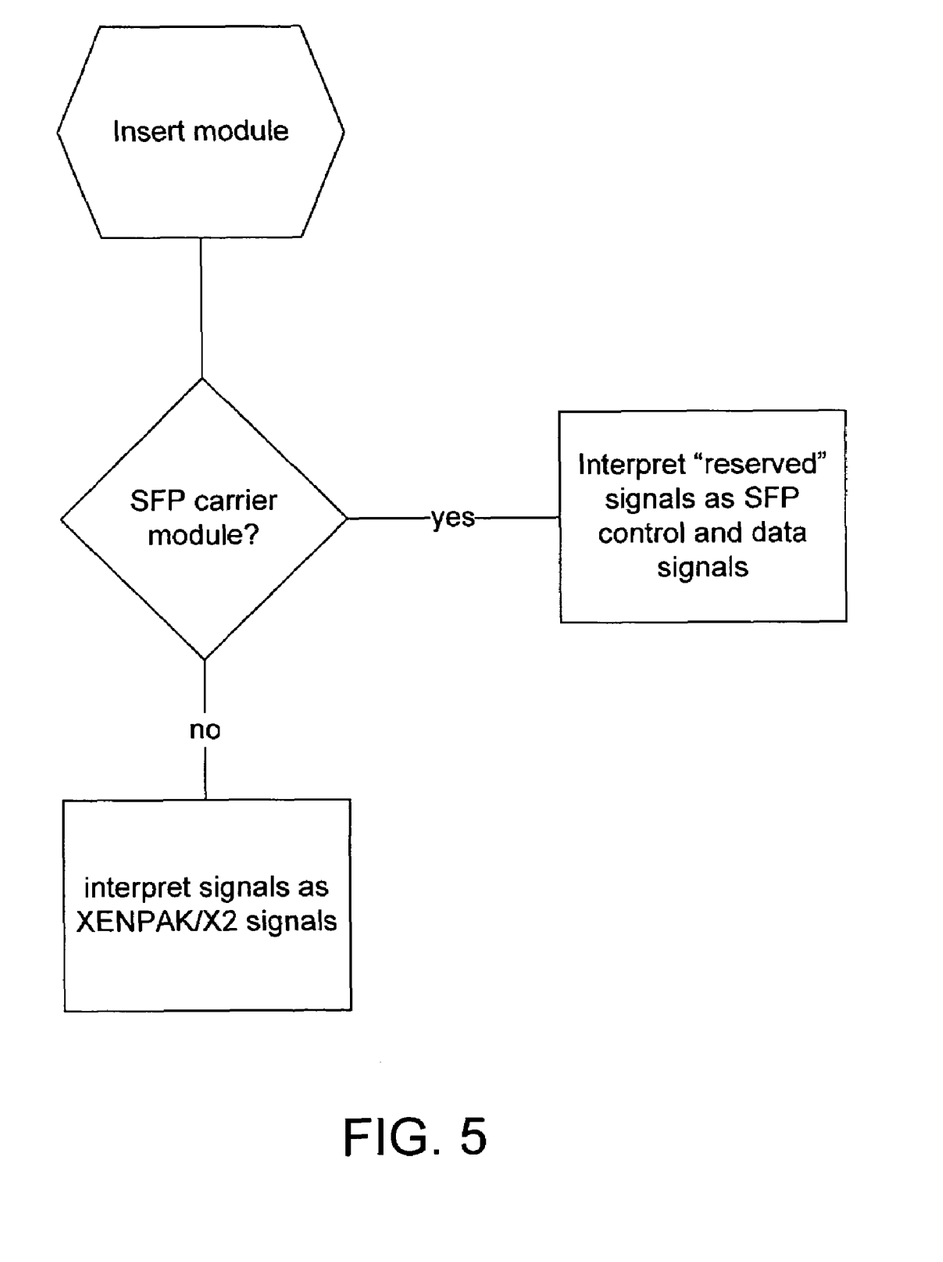
FIG. 5 is flow chart illustrating the operation of the SFP carrier module.

The operation of the system of this embodiment of the SFP carrier module will now be described with reference to the flow chart of FIG. 5.

In one embodiment, when a carrier module is plugged into a XENPAK/X2 slot, host software determines whether a XENPAK/X2 module or an SFP carrier module has been inserted. In this embodiment a signal on pin 14 of the 70-pin XENPAK/X2 connector is sampled. If the signal value is '0' then an SFP carrier module is in the slot.

If a XENPAK/X2 module is inserted in the slot the non-XAUI signals exchanged over the XENPAK/X2 70-pin interface are standard XENPAK/X2 signals.

In this embodiment, if an SFP carrier module is inserted in the slot the host software utilizes the redefined "reserved" and "vendor specific" pins of the 70-pin XENPAK/X2 connector to interface with the SFP modules on the SFP carrier module, and redefines existing pin usage.

Alternatively, the SFP module can be configured without the need to used reserved or vendor specific pins if a 1.2 voltage power supply is available.

The carrier card and XENPAK/X2 interface can also be configured to accept a 10 GE SFP module.

As described above, one technique of identifying a card inserted in the slot is to query a "cookie" on the card in the form of non-volatile ROM. However, ROM is expensive and reducing cost is an important priority when designing cards. Accordingly, in another embodiment of the invention, the host applies a stimulus to the XENPAK/X2 interface, consistent or compatible with the normal operation of the interface and a detectable response is generated by the module that can be used to determine the presence or absence of a carrier module in a XENPAK/X2 slot.

Figure 6:
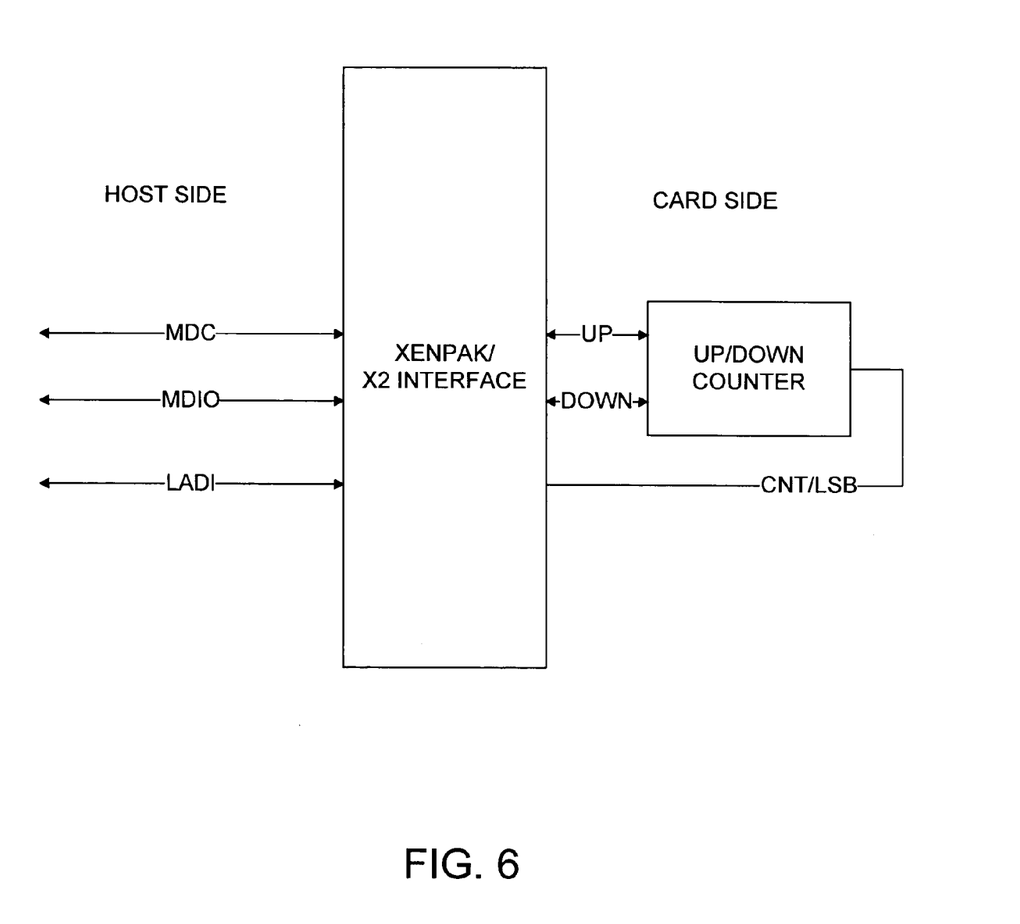
FIG. 6 is a block diagram of an embodiment of a card identification unit.

As depicted in FIG. 6, in one embodiment the response is generated by an up/down counter attached with up/down inputs coupled to the MDC and MDIO lines of the XENPAK/X2 interface with the resultant LSB output (parity bit) returned on a status line such as the LASI pin of the XENPAK/X2 interface. A sequence of stimuli and a sequence of responses could be used to enhance this embodiment.

When the expected response is detected by the host the module is detected. The activation of the remaining signal lines of the XENPAK/X2 interface can be delayed until after detection to avoid potential damage to an incompatible card.

Alternatively, other logic circuits, such as an inverter, can be stimulated by a sequence of signals so that the output of the logic circuit can be utilized by the host to unambiguously determine whether a carrier card or a XENPAK/X2 card is inserted in the slot.

The invention has now been described with reference to the preferred embodiments. Alternatives and substitutions will now be apparent to persons of skill in the art. Accordingly, it is not intended to limit the invention except as provided by the appended claims.

What is claimed is:

1. A carrier module comprising:
a XENPAK/X2 module body configured to be plugged into a XENPAK/X2 slot of a host, with the XENPAK/X2 module body having an interior edge and an exterior edge;
a XENPAK/X2 70-contact connector, disposed at the interior edge of the XENPAK/X2 module body, configured to interface with the XENPAK/X2 slot when the XENPAK/X2 module body is plugged into the XENPAK/X2 slot of the host, with the XENPAK/X2 connector including a first subset of contacts, a set of Rx XAUI contacts and a set of Tx XAUI contacts;
a cage, configured to accept a non-XENPAK/X2 10 GE module pluggable into a non-XENPAK/X2 slot of a host, with the cage disposed on the exterior edge of the XENPAK/X2 module body and oriented so that an opening of the cage is disposed at the exterior edge of the XENPAK/X2 module so that a non-XENPAK/X2 module can be inserted into the cage;
a module identification block, coupled to the first subset of contacts, configured to be used by the host to determine whether a carrier module holding a non-XENPAK/X2 module or a standard XENPAK/X2 module has been plugged into the XENPAK/X2 slot of the host; and
interface circuitry coupling the cage and the XENPAK/X2 70-contact connector, with the interface circuitry configured to interface a non-XENPAK/X2 module, plugged into the non-XENPAK/X2 cage, with the XENPAK/X2 70-contact connector and to convert serial data received at the non-XENPAK/X2 module into parallel data received on the Rx XAUI contacts on the XENPAK/X2 70-contact connector and to convert parallel data transmitted on Tx XAUI contacts of the XENPAK/X2 70-contact connector to serial data transmitted on the non-XENPAK/X2 module.

2. The module of claim 1 where:
the module identification block is a logic block toggled by the host and coupled to the first subset of contacts.

3. The module of claim 2 where:
the logic block is an up/down counter having up/down inputs toggled by the host and an output to the host coupled to an LSB output of the up/down counter.

4. The module of claim 1 where:
the first subset of contacts is coupled to a management bus; and
the module identification block is a non-volatile memory read by the host on start-up.

5. A carrier module comprising:
a XENPAK/X2 module body configured to be plugged into a XENPAK/X2 slot of a host, with the XENPAK/X2 module having an interior edge and an exterior edge;
a XENPAK/X2 70-contact connector, disposed at the interior edge of the XENPAK/X2 module body, configured to interface with the XENPAK/X2 slot when the XENPAK/X2 module body is plugged into the XENPAK/X2 slot of the host, with the connector including a first subset of contacts, a second subset of contacts coupled to transmit XAUI lanes, and a third subset of contacts coupled to receive XAUI lanes;
an XFP cage, configured to accept an XFP 10 GE module, with the XFP cage disposed on the exterior side of the XENPAK/X2 module body and oriented so that an opening of the XFP cage is disposed at the exterior edge of the XENPAK/X2 module so that an XFP module can be inserted into the XFP cage;
a module identification block, coupled to the first subset of contacts, configured to be used by a host to determine whether a XENPAK/X2 module or a carrier module holding an XFP module is inserted into a slot of the host;
a serializer/deserializer (SERDES) having a serial data port, a parallel data output port coupled to the second subset of contacts, and a parallel data input port coupled to the third subset of contacts; and
a high speed serial interface coupling the XFP cage to the serial port of the SERDES.

6. The carrier module of claim 5 where:
the module identification block is a non-volatile memory holding information indicating the functionality of the XFP 10 GE module.

7. The carrier module of claim 5 where:
the module identification block is logic circuit toggled by the host to determine whether a XENPAK/X2 module or carrier module holding an XFP module is inserted in a slot.

8. The carrier module of claim 5 where:
the module identification block provides for transparent operation of the carrier module requiring no change of software at the host.

9. A carrier module comprising:
a XENPAK/X2 module body configured to be plugged into a XENPAK/X2 slot of a host, with the XENPAK/X2 module body having an interior edge and an exterior edge;
a XENPAK/X2 70-contact connector, disposed at the interior edge of the XENPAK/X2 module body, configured to interface with the XENPAK/X2 slot when the XENPAK/X2 module body is plugged into the XENPAK/X2 slot of the host, with the connector including a first subset of contacts, a second subset of contacts for coupling to a first serial interface, and a third subset of contacts for coupling to a second serial interface;

first and second SFP cages, each configured to accept an SFP module, with the first and second SFP cages disposed on the exterior edge of the XENPAK/X2 module body and oriented so that openings of the first and second SFP cages are disposed at the exterior edge of the XENPAK/X2 module body so that an SFP module can be inserted into each of the first and second SFP cages;

a first serial interface coupling the first SFP cage to the second subset of contacts, with the first serial interface configured to transfer data received at an SFP module plugged into the first SFP cage to the second subset of contacts and to couple data transmitted from the second subset of contacts to the SFP module plugged into the first SFP cage;

a second serial interface coupling the second SFP cage to the third subset of contacts, with the second serial interface configured to transfer data received at an SFP module plugged into the second SFP cage to the third subset of contacts and to couple data transmitted from the third subset of contacts to the SEP module plugged into the second SFP cage; and a module identification block, coupled to the first subset of contacts, configured to be used by a host to determine whether a XENPAK/X2 module or an SFP module is inserted in a slot of the host.

10. The carrier module of claim 9 where:

the second and third subsets of contacts are assigned as "reserved" or "vendor specific " by the MSA.

11. The carrier module of claim 9 where the XENPAK/X2 70-pin connector includes a fourth subset of contacts and further comprising:

a multiplexer, coupled to the fourth subset of contacts and the first and second SFP cages for multiplexing SFP control signals and signals between the fourth subset of contacts and cookies on inserted SFP modules.

12. The carrier module of claim 9 where: the first and second serial interfaces are 1 Gigabit Ethernet serial interfaces.

13. The carrier module of claim 9 where: the first and second serial interfaces are 10 Gigabit Ethernet serial interfaces.

* * * * *

UNITED STATES PATENT AND TRADEMARK OFFICE
CERTIFICATE OF CORRECTION

PATENT NO. : 7,620,754 B2 Page 1 of 1
APPLICATION NO. : 11/090776
DATED : November 17, 2009
INVENTOR(S) : Yee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 542 days.

Signed and Sealed this

Fourteenth Day of December, 2010

David J. Kappos
*Director of the United States Patent and Trademark Office*